(12) United States Patent
Vogel

(10) Patent No.: US 10,596,892 B2
(45) Date of Patent: Mar. 24, 2020

(54) ENGINE ASSEMBLY MOUNTING FOR A MOTOR VEHICLE

(71) Applicant: AUDI AG, Ingolstadt (DE)

(72) Inventor: Friedemann Vogel, Wettstetten (DE)

(73) Assignee: AUDI AG, Ingolstadt (DE)

( * ) Notice: Subject to any disclaimer, the term of this patent is extended or adjusted under 35 U.S.C. 154(b) by 21 days.

(21) Appl. No.: 15/971,116

(22) Filed: May 4, 2018

(65) Prior Publication Data
US 2018/0345776 A1 Dec. 6, 2018

(30) Foreign Application Priority Data

Jun. 6, 2017 (DE) .......................... 10 2017 209 475

(51) Int. Cl.
| | | |
|---|---|---|
| B60K 5/12 | (2006.01) | |
| B60K 1/00 | (2006.01) | |
| F16F 15/08 | (2006.01) | |

(52) U.S. Cl.
CPC .................. B60K 1/00 (2013.01); B60K 5/12 (2013.01); B60K 5/1216 (2013.01); B60K 2001/001 (2013.01); B60Y 2400/48 (2013.01); F16F 15/08 (2013.01)

(58) Field of Classification Search
CPC . B60K 5/1216; B60K 5/1241; B60G 2204/18
See application file for complete search history.

(56) References Cited

U.S. PATENT DOCUMENTS

| | | | | |
|---|---|---|---|---|
| 1,021,061 A | * | 3/1912 | Maxim ................ | B60K 5/1216 180/292 |
| 2,123,226 A | * | 7/1938 | Benedek .............. | B60K 5/1241 248/582 |
| 3,024,041 A | * | 3/1962 | Maruhn ................ | B60G 13/18 280/124.109 |
| 3,970,162 A | * | 7/1976 | Le Salver ............. | B60G 11/54 180/291 |
| 4,643,270 A | * | 2/1987 | Beer ..................... | B60G 13/16 180/299 |
| 6,213,240 B1 | * | 4/2001 | Buell .................... | B62K 11/04 180/228 |

(Continued)

FOREIGN PATENT DOCUMENTS

| | | |
|---|---|---|
| DE | 3342820 A1 | 6/1985 |
| DE | 10244361 A1 | 4/2004 |

(Continued)

OTHER PUBLICATIONS

Search Report dated Jan. 5, 2018 of corresponding German Application No. 102017209475.3; 10 pgs.

(Continued)

*Primary Examiner* — Bradley Duckworth
(74) *Attorney, Agent, or Firm* — Maier & Maier, PLLC

(57) ABSTRACT

An engine assembly arrangement for a motor vehicle, with a drive assembly, which is mounted directly at a support element via at least one first fixed bearing. A support structure engages at the drive assembly, on the one hand, via a second fixed bearing and via a third fixed bearing that is spaced apart from the second fixed bearing, and, on the other hand, is articulated at the support element via a fourth fixed bearing.

7 Claims, 1 Drawing Sheet

(56) References Cited

U.S. PATENT DOCUMENTS

| | | | |
|---|---|---|---|
| 6,464,033 B2* | 10/2002 | Izumi | B60K 5/1216 |
| | | | 180/182 |
| 6,629,576 B2* | 10/2003 | Kramer | B60K 5/1216 |
| | | | 180/291 |
| 6,761,242 B2* | 7/2004 | Yoshida | B60K 5/12 |
| | | | 180/232 |
| 7,357,402 B2* | 4/2008 | Berghus | B60G 11/00 |
| | | | 280/124.109 |
| 9,127,397 B2 | 9/2015 | Moon et al. | |
| 9,694,676 B2* | 7/2017 | Bandy | B60K 5/02 |
| 9,914,347 B2 | 3/2018 | Otte et al. | |
| 10,124,905 B2* | 11/2018 | Barsali | B64D 41/00 |
| 2013/0112840 A1 | 5/2013 | Glover et al. | |
| 2016/0243925 A1* | 8/2016 | Otte | B60L 50/10 |

FOREIGN PATENT DOCUMENTS

| | | |
|---|---|---|
| DE | 10 2013 222 778 A1 | 5/2015 |
| DE | 20 2016 102 237 U1 | 6/2016 |
| WO | 2004/080733 A1 | 9/2004 |

OTHER PUBLICATIONS

Search Report dated Nov. 6, 2018 in corresponding European Application No. 18168673; 10 pages including partial machine-generated English-language translation.

* cited by examiner

ENGINE ASSEMBLY MOUNTING FOR A MOTOR VEHICLE

FIELD

The invention relates to an engine assembly arrangement for a motor vehicle, with a drive assembly that is mounted via at least one first fixed bearing directly at a support element.

BACKGROUND

The engine assembly arrangement serves preferably for driving the motor vehicle and in this regard, therefore, for supplying a torque directed at driving the vehicle.

The drive assembly is present here as a traction machine of the motor vehicle. For supplying the torque, the engine assembly arrangement is equipped with the drive assembly, which can fundamentally be designed in any way. For example, the drive assembly is present in the form of an electric machine, in particular an electric motor. The drive assembly is mounted via the at least one first fixed bearing directly at the support element. The support element, in turn, is arranged and fastened to a vehicle body, a vehicle chassis, an engine assembly carrier, or the equivalent or constitutes a part of one of the elements mentioned. The support element is present here, for example, in the form of the engine assembly carrier, a region of the vehicle body, or a region of the vehicle chassis.

The first fixed bearing is fastened in a fixed position at the support element. The drive assembly is mounted via the first fixed bearing at the support element and, in particular, is mounted rotatably around an axis of rotation of the first fixed bearing. It can be provided that the drive assembly is mounted via exactly one first fixed bearing at the support element. Of course, however, the use of a plurality of first fixed bearings is also possible, in which case the drive assembly is mounted directly at the support element via a plurality of first fixed bearings, which are preferably each spaced apart from one another. The first fixed bearings are thereby arranged next to one another and, in particular, their axes of rotation coincide in a common axis of rotation.

Because, based on the use of a fixed bearing, such a mounting of the drive assembly at the support element cannot pick up any torque, it is necessary to support the drive assembly additionally with respect to the support element. For this purpose, it is possible to provide, for example, a articulated support, which, on the one hand, engages at the drive assembly and, on the other hand, engages at the support element. In an embodiment of this kind, however, it is possible to create only a small support base, so that large forces act on the at least one first fixed bearing as well as on the articulated support.

Known from the prior art is the publication DE 102 44 361 A1. This document shows an apparatus for vibration damping in a vehicle, wherein a vehicle subframe is provided with bearings for a component that is to be mounted, preferably an engine assembly. Provided are means that fix or limit the distance between the vehicle subframe and a bearing of a spring damper strut, wherein the vehicle subframe is attached to a bearing of the spring damper strut in a substantially rigid manner. For this purpose, a strut is attached between the vehicle subframe and a bearing of the spring damper strut or a bearing of a damper.

SUMMARY

The object of the invention is to propose an engine assembly arrangement for a motor vehicle, which, in comparison to known engine assembly arrangements, has advantages and, in particular, creates a large support base with elements that engage directly at the drive assembly, so that, in comparison to the known engine assembly arrangements, marked advantages in terms of weight and/or packing space can be achieved.

This is accomplished in accordance with the invention with an engine assembly arrangement for a motor vehicle having the features of claim 1. In this case, it is provided that a support structure engages at the drive assembly, on the one hand, via a second fixed bearing and via a third fixed bearing that is spaced apart from the second fixed bearing and, on the other hand, is articulated via a fourth fixed bearing at the support element.

Via the support structure, the drive assembly is only indirectly mounted to the support element. The support structure engages by way of two fixed bearings, namely, the second fixed bearing and the third fixed bearing, at the drive assembly. This means that the second fixed bearing and the third fixed bearing are each connected rigidly to the drive assembly. The second fixed bearing and the third fixed bearing each attach the support structure rotatably around a respective axis of rotation of the fixed bearing at the drive assembly. Based on the mutually spaced arrangement of the second fixed bearing and the third fixed bearing at the drive assembly, however, a marked rigidification is already achieved, in particular against the backdrop that the support structure is articulated at the support element on its side facing away from the second fixed bearing and the third fixed bearing via the fourth fixed bearing.

In other words, the support structure therefore engages at the drive assembly, on the one hand, via two fixed bearings that are spaced apart from each other, namely, the second fixed bearing and the third fixed bearing, whereas, on its side facing away from the drive assembly, it engages at the support element via a smaller number of fixed bearings, namely, preferably exactly one single fixed bearing. The fourth fixed bearing is rigidly connected, in analogy to the first fixed bearing, to the support element. Via the fourth fixed bearing, the support structure is mounted rotatably at the support element via an axis of rotation.

Based on the attachment of the support structure to the drive assembly and the support element via at least three fixed bearings, namely, the second fixed bearing, the third fixed bearing, and the fourth fixed bearing, a high rigidity of the engine assembly arrangement is achieved, at the same time with a smaller support base, and consequently there is a reliable holding of the drive assembly with respect to the support element.

The fixed bearing engaging at the drive assembly, that is, the at least one first fixed bearing, the second fixed bearing, and the third fixed bearing, preferably are in distributed arrangement in the circumferential direction with respect to a longitudinal central axis of the drive assembly and/or with respect to an axis of rotation of a drive shaft of the drive assembly, and are therefore spaced apart from one another in the circumferential direction. The fixed bearings are arranged in such a way that, via the at least one first fixed bearing, a large part of the weight of the drive assembly is passed into the support element, namely, in particular, a greater fraction of the weight than via the fourth fixed bearing.

For example, the first fixed bearing lies on a first side of an imaginary plane that incorporates in it the longitudinal central axis or the axis of rotation, whereas the support structure or at least the fourth fixed bearing is arranged on a second side of the plane that lies opposite to the first side.

Preferably, it can be provided that the first fixed bearing is arranged on the first side of the imaginary plane, whereas both the second fixed bearing and the third fixed bearing are arranged on the second side. In addition, it is possible in this case for the fourth fixed bearing and the support structure likewise to be present on the second side.

In relation to the longitudinal central axis or the axis of rotation, the distance in the circumferential direction between the at least one first fixed bearing, on the one hand, and the second fixed bearing or the third fixed bearing, on the other hand, is at least 30°, at least 45°, or at least 60°. Especially preferred is an arrangement in which the first fixed bearing, the second fixed bearing, and the third fixed bearing are arranged in uniform distribution over the circumference of the drive assembly, once again in relation to the longitudinal central axis or the axis of rotation.

With the described engine assembly arrangement, the support structure can be made relatively small, in particular with respect to the distances between the second fixed bearing and/or the third fixed bearing, on the one hand, and the fourth fixed bearing, on the other hand. Accordingly, pronounced dynamic vibrational amplitudes, such as those than can occur for larger support elements, in particular for greater distances between the second fixed bearing or the third fixed bearing and the fourth fixed bearing, can be prevented. On the one hand, therefore, the structure-borne noise that arises is prevented. On the other hand, the packing space needed for the engine assembly arrangement is markedly reduced owing to the relatively small design of the support structure.

Another embodiment of the invention provides that the support structure has a first rod control arm and a second rod control arm. In this case, the support structure is not designed as a solid component, but rather is equipped with a plurality of elements that are designed separately from one another, namely, for example, at least the first rod control arm and the second rod control arm. The two rod control arms are arranged spaced apart from each other at least in regions. An embodiment of the support structure of this kind has an extremely low weight in comparison to a solid component.

In the scope of another embodiment of the invention, it is provided that the first rod control arm, on the one hand, engages via the second fixed bearing at the drive assembly and, on the other hand, is articulated via the fourth fixed bearing at the support element. On a first side, the first rod control arm is therefore articulated rotatably at the drive assembly, namely, via the second fixed bearing. On a side lying opposite to the first side, it is mounted rotatably at the support element, namely, via the fourth fixed bearing.

Another preferred embodiment of the invention provides that the second rod control arm, on the one hand, engages via the third fixed bearing at the drive assembly and, on the other hand, is articulated at the support element via the fourth fixed bearing. For the second rod control arm, preferably the same applies as for the first rod control arm, but with the difference that it engages at the drive assembly via the third fixed bearing instead of the second fixed bearing. In this regard, for the second rod control arm, reference is made in the full extent to the above statements in regard to the first rod control arm.

It is clear that the two rod control arms, that is, the first rod control arm and the second rod control arm, engage spaced apart from each other at the drive assembly, namely, the first rod control arm via the second fixed bearing and the second rod control arm via the third fixed bearing. On the other hand, however, they are jointly articulated at the support element via the fourth fixed bearing and are jointly mounted here at the support element. For example, the two rod control arms are connected to each other on their side facing the fourth fixed bearing and, in particular, are fastened rigidly to each other. The embodiment described has an especially high rigidity.

An enhancement of the invention provides that the first rod control arm and the second rod control arm are connected independently of each other to the fourth fixed bearing or are connected to each other on their side facing the fourth fixed bearing and jointly engage at the fourth fixed bearing.

Fundamentally, in this regard, it is possible to create two different embodiments of the engine assembly arrangement. In the first embodiment, the two rod control arms can also be shifted in position with respect to each other on their side facing the fourth fixed bearing and, in particular, can be rotated opposite to each other around the axis of rotation of the fourth fixed bearing. In this case, the two rod control arms engage, independently of each other, at the fourth fixed bearing and in this regard, are articulated by means of the fourth fixed bearing jointly, but independently of each other, at the support element.

Alternatively, in a second embodiment, it can be provided that the two rod control arms are connected to each other on their side facing the fourth fixed bearing, namely, preferably rigidly. The connection of the two rod control arms can be produced here, for example, in a form-fitting manner, in a force-fitting manner, and/or in a material-bonded manner. In the latter case, the two rod control arms are welded to each other, for example.

Another preferred embodiment of the invention provides that the first rod control arm is decoupled from the second rod control arm in at least one region lying between the second fixed bearing and the fourth fixed bearing and/or that the second rod control arm is decoupled from the first rod control arm in at least one region lying between the third fixed bearing and the fourth fixed bearing. This is understood to mean that the two rod control arms each have a region that is arranged spaced apart from the respective other rod control arm and therefore is not in physical contact with it or fastened to it. The region of the first rod control arm lies along its longitudinal extension between the second fixed bearing and the fourth fixed bearing, whereas the region of the second rod control arm lies along its longitudinal extension between the third fixed bearing and the fourth fixed bearing.

The first rod control arm and/or the second rod control arm can each have a plurality of said regions, which are decoupled from the respective other rod control arm, whereas they are connected to each other between said regions, for example, via at least one strut, which extends from the first rod control arm all the way to the second rod control arm, or vice versa.

An enhancement of the invention provides that at least one strut connected to the second rod control arm and/or an additional strut connected to the second rod control arm engage(s) at an additional region of the first rod control arm that lies between the second fixed bearing and the fourth fixed bearing. It has already been pointed out above that the two rod control arms each have regions in which they are decoupled from each other or are spaced apart from each other. However, the first rod control arm can then have the additional region, in which exactly one such coupling is provided. For example, the additional region lies between two of the regions mentioned above and, in particular, said regions directly adjoin the additional region on both sides.

In the additional region of the first rod control arm, the strut and/or the additional strut engage at it. The strut and/or the additional strut are connected to the second rod control arm at their end facing away from the first rod control arm. Preferably, the strut or the additional strut engage, on the one hand, rigidly at the first rod control arm and, on the other hand, rigidly at the second rod control arm, and therefore couples them rigidly to each other. For example, the strut and/or the additional strut is/are connected, on the one hand, to the first rod control arm in a form-fitting manner, in a force-fitting manner, and/or in a material-bonded manner, and, on the other hand, to the second rod control arm in a form-fitting manner, in a force-fitting manner, and/or in a material-bonded manner.

A preferred enhancement of the invention provides that the strut and the additional strut engage spaced apart from each other at the first rod control arm and are jointly connected to the second rod control arm. A framework structure of the support structure is created here by means of the two rod control arms and the two struts, namely, the strut and the additional strut. The two struts engage spaced apart from each other at the first rod control arm, but at the same point or at least at nearly the same point of the second rod control arm. For example, the two struts are therefore connected directly to each other on their side facing the second rod control arm.

Another embodiment of the invention provides that the first fixed bearing, the second fixed bearing, the third fixed bearing, and the fourth fixed bearing each are designed as an elastomeric bearing. It is possible in this case to refer to the first fixed bearing as a first elastomeric bearing, the second fixed bearing as a second elastomeric bearing, the third fixed bearing as a third elastomeric bearing, and the fourth fixed bearing as a fourth elastomeric bearing. The elastomeric bearings are each designed in such a way, for example, that a fastening element engages centrally through a damping body of the elastomeric bearing. In other words, the damping body engages completely around the fastening element in the circumferential direction.

It is then provided that the elements that are each to be mounted to one another are coupled exclusively via the damping element. In the case of the first fixed bearing, therefore, the drive assembly is connected to the support element exclusively via the damping element of the first fixed bearing, and, in the case of the second fixed bearing and the third fixed bearing, the support structure is connected to the drive assembly exclusively via the damping body of the two fixed bearings and, in the case of the fourth fixed bearing, the support structure is articulated at the support element exclusively via the damping element of the fourth fixed bearing. The damping element is designed in a vibration-damping manner in each case, so that, by means of the elastomeric bearing, a vibration damping is achieved between the elements that are mounted to one another.

Finally, it is possible in the scope of another preferred embodiment of the invention to provide that the second fixed bearing and the third fixed bearing each have a higher rigidity than the first fixed bearing and/or the fourth fixed bearing. This is provided, in particular, in the case of the embodiment of the fixed bearing as an elastomeric bearing. The first fixed bearing bears the main part of the weight of the drive assembly and is designed optimally in regard to its rigidity for isolation from structure-borne noise. In contrast, the second bearing and the third fixed bearing are more rigid or harder than the first fixed bearing; in particular, their rigidity is higher by a least 25%, at least 50%, at least 75%, or at least 100%. Preferably, the second fixed bearing and the third fixed bearing have the same rigidity.

In this respect, the attachment of the support structure to the drive assembly via the second fixed bearing and the third fixed bearing is relatively rigid. In order to prevent the input of structure-borne noise from the drive assembly into the support structure, the fourth fixed bearing, by way of which the support structure is articulated at the support element, is then designed, in turn, to be relatively soft. In this respect, it preferably has a lesser rigidity than the second fixed bearing and the third fixed bearing.

In addition, the invention obviously relates to a motor vehicle with an engine assembly arrangement, in particular an engine assembly arrangement in accordance with the above statements, wherein the engine assembly arrangement has a drive assembly that is mounted via at least one first fixed bearing directly at a support element. It is thereby provided that a support structure, on the one hand, engages at the drive assembly via a second fixed bearing and via a third fixed bearing that is spaced apart from the second fixed bearing, and, on the other hand, is articulated at the support element via a fourth fixed bearing.

Reference has already been made to the advantages of such an embodiment of the engine assembly arrangement or of the motor vehicle. Both the motor vehicle and thus the engine assembly arrangement can be further developed in accordance with the above statements, so that reference is made to said statements in this regard.

BRIEF DESCRIPTION OF THE DRAWINGS

The invention will be explained in detail below on the basis of the exemplary embodiments illustrated in the drawing, without any limitation of the invention thereby ensuing. Shown herein are.

DETAILED DESCRIPTION OF THE DRAWINGS

Figure 1:
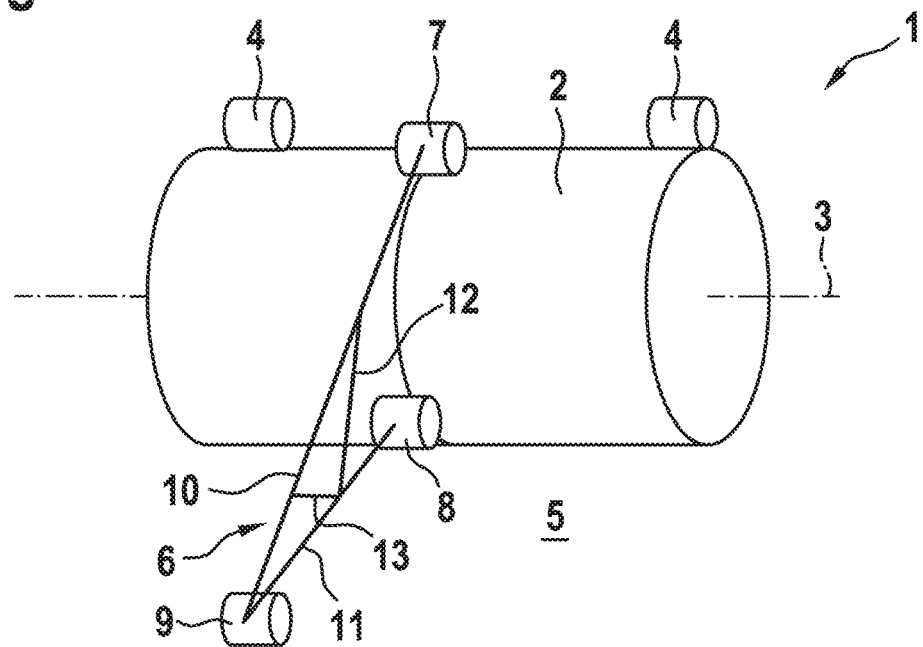
FIG. 1 a schematic illustration of an engine assembly arrangement in a first embodiment and view, as well as FIG. 2 the engine assembly arrangement in a schematic illustration in a second embodiment and view.

FIG. 1 shows a schematic illustration of an engine assembly arrangement 1 for a motor vehicle in a first embodiment. The engine assembly arrangement 1 is equipped with a drive assembly 2, which is designed, for example, as an electric machine. The drive assembly 2 has, for example, a longitudinal central axis 3. Alternatively, the longitudinal central axis 3 may be present in the form of an axis of rotation of a drive shaft of the drive assembly 2. The drive assembly 2 is mounted via at least one first fixed bearing 4 at a support element 5, which is not shown here in further detail, and, in particular, is mounted rotatably. In the exemplary embodiment illustrated here, a plurality of first fixed bearings 4, namely, exactly two first fixed bearings 4, are provided, which engage at the drive assembly 2 spaced apart in the axial direction with respect to the longitudinal central axis 3.

In addition, the drive assembly 2 is attached via a support structure 6 at the support element 5. The support structure 6 engages, on the one hand, via a second fixed bearing 7 and a third fixed bearing 8 at the drive assembly 2. The two fixed bearings 7 and 8 are arranged spaced apart from each other in the circumferential direction with respect to the longitudinal central axis 3 or engage spaced apart from each other at the drive assembly 2. In the exemplary embodiment illustrated here, the second fixed bearing 7 and the third fixed bearing 8 are arranged in the axial direction centered between the two first fixed bearings 4. If only one first fixed bearing 4 is provided, then said fixed bearing is preferably arranged at the same axial position as the second fixed bearing 7 and the third fixed bearing 8.

On its side facing away from the second fixed bearing 7 and the third fixed bearing 8, the support structure 6 is articulated at the support element 5 via a fourth fixed bearing 9. The attachment of the support structure 6 by means of the second fixed bearing 7, by means of the third fixed bearing 8, and by means of the fourth fixed bearing 9 is preferably designed rotatably in each case. Based on the mutually spaced arrangement of the second fixed bearing 7 and the third fixed bearing 8 at the drive assembly 2 in the circumferential direction, however, any rotational movement of the support structure 6 with respect to the drive assembly 2 and the support element 5 is largely prevented.

It can be seen that the support structure 6 has a first rod control arm 10 as well as a second rod control arm 11. The two rod control arms 10 and 11 engage separately from each other at the drive assembly 2, namely, the first rod control arm 10 via the second fixed bearing 7 and the second rod control arm 11 via the third fixed bearing 8. In contrast, they are articulated at the support element 5 on their sides facing away from the drive assembly 2 via the fourth fixed bearing 9. The two rod control arms 10 and 11 are arranged spaced apart from each other to a large extent and, in particular, the distance from the fixed bearing in the direction of the drive assembly 2 increases steadily. Preferably, the two rod control arms 10 and 11 are each straight in design and, in particular, continuously straight in design. Preferably, they come into physical contact only on their side facing the fourth fixed bearing 9 or in the region of the fourth fixed bearing 9.

In the exemplary embodiment illustrated here, the two rod control arms 10 and 11 are connected to each other via a strut 12 as well as an additional strut 13. The struts 12 and 13 engage spaced apart from each other at the first rod control arm 10, whereas they engage jointly at the second rod control arm 11, and in particular, therefore, at the same point of the second rod control arm 11. Preferably, the two struts 12 and 13 are each connected rigidly both to the first rod control arm 10 and thus to the second rod control arm 11, preferably in a material-bonded manner. Both struts 12 and 13 preferably each extend straight, namely, in particular, continuously straight.

The fixed bearings of the engine assembly arrangement 1 and, therefore, more precisely, the first fixed bearing 4, the second fixed bearing 7, the third fixed bearing 8, and the fourth fixed bearing 9 are each designed as an elastomeric bearing. The second fixed bearing 7 and the third fixed bearing 8 in this case each have a higher rigidity than either the first fixed bearing 4, the fourth fixed bearing 9, or both of these. Preferably, in contrast, the second fixed bearing 7 and the third fixed bearing 8 have the same rigidity.

Figure 2:
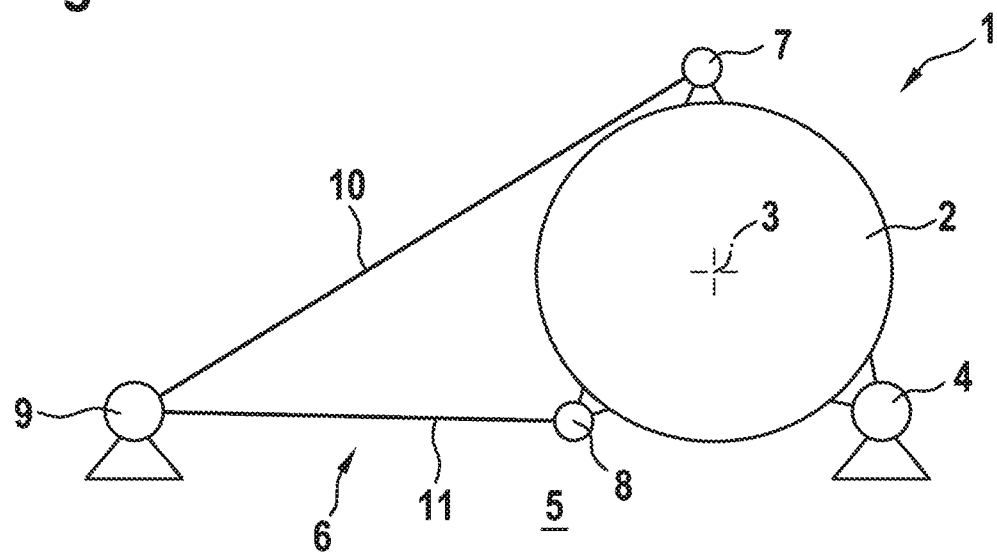

FIG. 2 shows a second embodiment of the engine assembly arrangement 1 in another view. Fundamentally, reference is made to the above statements and only differences will be addressed below. These differences lie in the fact that the first fixed bearing 4 or the first fixed bearings 4 is/are arranged in the circumferential direction at another place with respect to the drive assembly 2. In the scope of the second exemplary embodiment, the first fixed bearing 4 and the fourth fixed bearing 9 engage preferably at a flat surface of the support element 5. However, other designs of the support element 5 can be realized. In addition, in the exemplary embodiment illustrated here, the above-described struts 12 and 13 are dispensed with. Optionally, however, they can obviously likewise be provided.

With the engine assembly arrangement 1 explained in the scope of the description, a suspension of the drive assembly 2 with respect to the support element 5 is possible, for which an outstanding vibration damping is achieved, while at the same time, a low weight and/or a required small packing space is also achieved. This is accomplished, in particular, by way of relatively thin rod control arms 10 and 11, which need to bear only a fraction of the weight of the drive assembly 2 and are designed for picking up a torque of the drive assembly 2 around the longitudinal central axis 3 or axis of rotation 3.

The invention claimed is:

1. An engine assembly arrangement for a motor vehicle, comprising:
   a drive assembly, which is mounted directly at a support element via at least one first fixed bearing, wherein one end of a support structure engages the drive assembly via a second fixed bearing and a third fixed bearing, the third fixed bearing spaced apart from the second fixed bearing, and the other end of the support structure is articulated at the support element via a fourth fixed bearing;
   wherein the support structure comprises a first rod control arm and a second rod control arm,
   wherein the first rod control arm, at one end, engages the drive assembly via the second fixed bearing and, at the other end, is articulated at the support element via the fourth fixed bearing,
   wherein the second rod control arm, at one end, engages the drive assembly via the third fixed bearing and, at the other end, is articulated at the support element via the fourth fixed bearing with the first rod control arm.

2. The engine assembly arrangement according to claim 1, wherein the first rod control arm and the second rod control arm are connected independently of each other to the fourth fixed bearing or are connected to each other on their side facing the fourth fixed bearing and engage jointly at the fourth fixed bearing.

3. The engine assembly arrangement according to claim 1, wherein, in at least one region lying between the second fixed bearing and the fourth fixed bearing, the first rod control arm is decoupled from the second rod control arm, and/or in at least one region lying between the third fixed bearing and the fourth fixed bearing, the second rod control arm is decoupled from the first rod control arm.

4. The engine assembly arrangement according to claim 3, wherein at least one strut connected to the second rod control arm and/or an additional strut connected to the second rod control arm engage(s) at an additional region of the first rod control arm lying between the second fixed bearing and the fourth fixed bearing.

5. The engine assembly arrangement according to claim 4, wherein the at least one strut and the additional strut engage spaced apart from each other at the first rod control arm and are connected jointly to the second rod control arm.

6. The engine assembly arrangement according to claim 1, wherein the first fixed bearing, the second fixed bearing, the third fixed bearing, and the fourth fixed bearing are each designed as an elastomeric bearing.

7. The engine assembly arrangement according to claim 1, wherein the second fixed bearing and the third fixed bearing each have a higher rigidity than the first fixed bearing and/or the fourth fixed bearing.

* * * * *